United States Patent
Ananthanarayanan

(10) Patent No.: US 10,409,754 B2
(45) Date of Patent: Sep. 10, 2019

(54) INTERCONNECTED MEMORY SYSTEM AND METHOD OF OPERATION THEREOF

(71) Applicant: SMART Modular Technologies, Inc., Newark, CA (US)

(72) Inventor: Rajesh Ananthanarayanan, Mountain View, CA (US)

(73) Assignee: SMART Modular Technologies, Inc., Newark, CA (US)

(*) Notice: Subject to any disclaimer, the term of this patent is extended or adjusted under 35 U.S.C. 154(b) by 244 days.

(21) Appl. No.: 15/141,757

(22) Filed: Apr. 28, 2016

(65) Prior Publication Data

US 2017/0315949 A1    Nov. 2, 2017

(51) Int. Cl.
*G06F 13/38* (2006.01)
*G06F 13/40* (2006.01)
*G06F 3/06* (2006.01)

(52) U.S. Cl.
CPC ........ *G06F 13/4068* (2013.01); *G06F 3/0604* (2013.01); *G06F 3/067* (2013.01); *G06F 3/0629* (2013.01)

(58) Field of Classification Search
None
See application file for complete search history.

(56) References Cited

U.S. PATENT DOCUMENTS

| | | | |
|---|---|---|---|
| 9,411,775 B2* | 8/2016 | Sharp | G06F 15/167 |
| 2004/0199832 A1 | 10/2004 | Powers et al. | |
| 2005/0235090 A1 | 10/2005 | Lee et al. | |
| 2007/0106833 A1 | 5/2007 | Rankin et al. | |
| 2009/0177832 A1 | 7/2009 | Gunzinger et al. | |
| 2016/0294983 A1* | 10/2016 | Kliteynik | G06F 15/17331 |
| 2017/0017607 A1* | 1/2017 | He | G06F 3/0655 |

FOREIGN PATENT DOCUMENTS

KR    10-2001-0101628    11/2001

OTHER PUBLICATIONS

World Intellectual Property Organization, Application No. PCT/US17/29001, International Search Report dated Jul. 18, 2017.
World Intellectual Property Organization, Application No. PCT/US17/29001, Pending Claims as of Jul. 18, 2017.

* cited by examiner

*Primary Examiner* — Cheng Yuan Tseng
(74) *Attorney, Agent, or Firm* — Wong & Rees LLP

(57) ABSTRACT

An interconnected memory system, and a method of operation thereof, including: a first discrete unit having a first unit processor and first unit memory module; a high-speed interconnect connected directly to the first unit memory module; and a second discrete unit having a second unit processor and a second unit memory module, the second unit memory module connected to the first unit memory module through the high-speed interconnect for utilizing the first unit memory module and the second unit memory module with the first unit processor.

20 Claims, 4 Drawing Sheets

INTERCONNECTED MEMORY SYSTEM AND METHOD OF OPERATION THEREOF

TECHNICAL FIELD

The present invention relates generally to an interconnected memory system, and more particularly to a system for fully utilizing memory capacity.

BACKGROUND ART

There is a continual need in the area of electronics and electronic computing systems toward systems with greater computing performance for a given space and within a given power profile. Additionally, as more and more functionality moves to the cloud, scalability within a short time frame becomes increasingly important. Within the systems powering the cloud, the integrated circuit and memory modules are the building blocks used in high performance electronic systems to provide the back-end power for cloud-supported applications for usage in products such as automotive vehicles, computers, cell phone, intelligent portable military devices, aeronautical spacecraft payloads, and a vast line of other similar products that require a robust back-end supporting many complex functions.

Products must compete in world markets and attract many consumers or buyers in order to be successful. It is very important for products to continue to improve in features, performance, and reliability while reducing product costs, product size, and to be available quickly for purchase by the consumers or buyers. Additionally, it is important for any cloud-based service to have as much power as possible so that less time is required to perform calculations within the cloud, ultimately reducing the time an end-user must wait for a response. However, simply purchasing more equipment causes costs for a cloud-based service provider or for any other user of powerful computing systems to increase very quickly.

Thus, a need still remains for increasing the power of datacenters in a cost-effective manner. In view of the rising importance of the cloud and datacenters, and the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of an interconnected memory system of an interconnected memory system that includes providing a first discrete unit having a first unit processor and first unit memory module; providing a second discrete unit having a second unit processor and a second unit memory module; connecting a high-speed interconnect directly to the first unit memory module; connecting the second unit memory module to the first unit memory module through the high-speed interconnect; and utilizing the first unit memory module and the second unit memory module with the first unit processor.

The present invention provides an interconnected memory system that includes a first discrete unit having a first unit processor and first unit memory module; a high-speed interconnect connected directly to the first unit memory module; and a second discrete unit having a second unit processor and a second unit memory module, the second unit memory module connected to the first unit memory module through the high-speed interconnect for utilizing the first unit memory module and the second unit memory module with the first unit processor.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
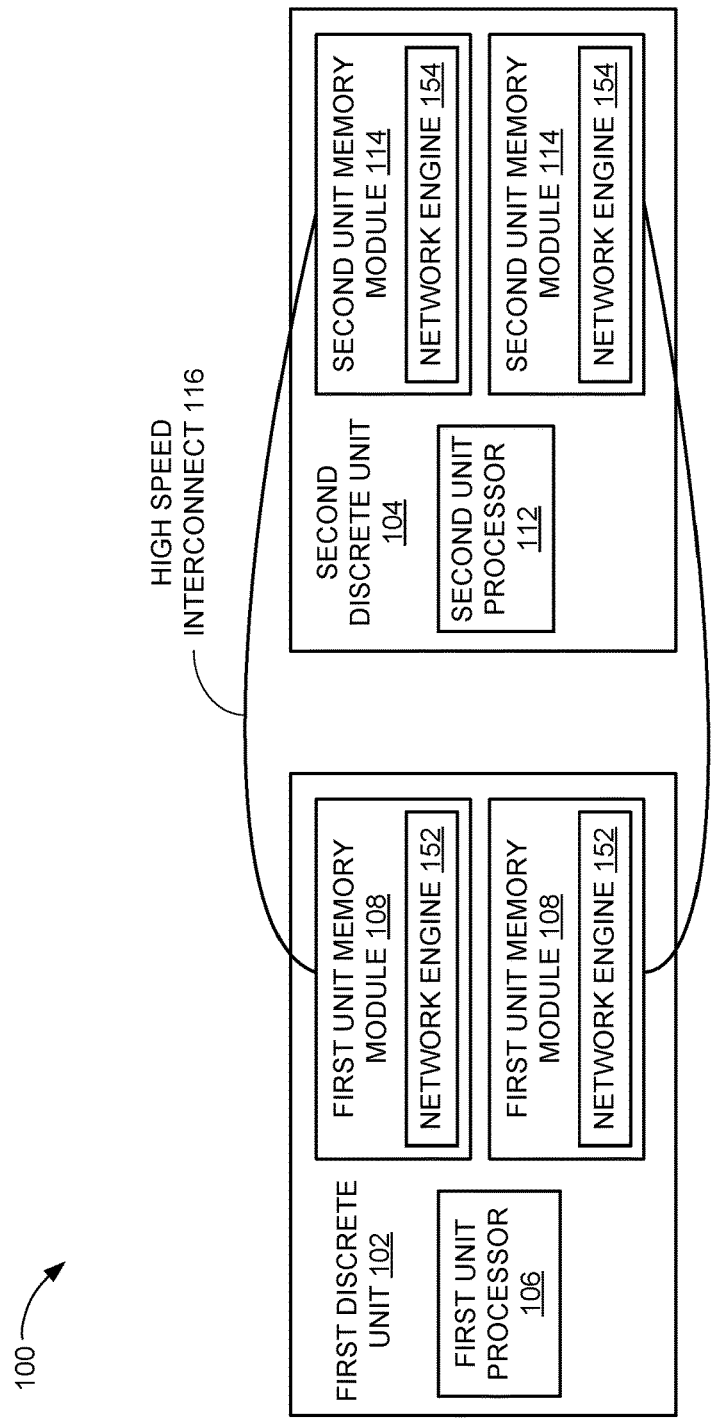
FIG. 1 is an interconnected memory system in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

Referring now to FIG. 1, therein is shown an interconnected memory system 100 in a first embodiment of the present invention. Visible in this figure are a first discrete unit 102 and a second discrete unit 104. The first discrete unit 102 and the second discrete unit 104 can operate independently from each other. Examples where the interconnected memory system 100 can be implemented include datacenters, cloud storage and service centers, server farms, or any locations where multiple independent systems operate in close proximity. In these examples, the first discrete unit 102 and the second discrete unit 104 can be independent servers in traditional cases, blades in a rack, or any other configuration which separates independent units from each other.

The first discrete unit 102 contains a first unit processor 106 and first unit memory modules 108. Storage units and other necessary hardware are omitted from the drawings for clarity. The first unit processor 106 acts as the central processing unit for the first discrete unit 102 and uses the first unit memory modules 108 to carry out various processing tasks. The first unit memory modules 108 can have volatile memory, nonvolatile memory, or some combination thereof. For example, the first unit memory modules 108 can be DRAM modules with or without some type of NAND flash memory.

The second discrete unit 104 contains a second unit processor 112 and second unit memory modules 114. Storage units and other necessary hardware are not shown for clarity. The second unit processor 112 acts as a central processing unit for the second discrete unit 104 and uses the second unit memory modules 114 to carry out various processing tasks. The second unit memory modules 114 can have volatile memory, nonvolatile memory, or some combination thereof. For example, the second unit memory modules 114 can be DRAM modules with or without some type of NAND flash memory. The second discrete unit 104 can contain the same or modified hardware as compared to the first discrete unit 102.

The first unit memory modules 108 and the second unit memory modules 114 can be connected by high-speed interconnects 116. The high-speed interconnects 116 are shown as curved lines in this example, and only one is labeled for clarity. The high-speed interconnects 116 can be connected directly to the first unit memory modules 108 and the second unit memory modules 114. The high-speed interconnects 116 can be ethernet, optical fiber, or any other interconnect operating at speeds above 1 Gbps, for example.

The first unit memory modules 108 can each include a network engine 152. The network engine 152 is defined as hardware for enabling and processing network traffic. The network engine 152 can be a chip, for example. The network engine 152 can also be integrated within other chips located on the first unit memory modules 108, for example. The network engine 152 is shown as being included within the first unit memory modules 108, but it is understood that this is for illustrative purposes and that the network engine 152 could also be separate from the first unit memory modules 108. For example, the network engine 152 can be located elsewhere within the first discrete unit 102 such as on the motherboard adjacent to the first unit memory modules 108. If this were the case, the high-speed interconnects 116 can be connected to the motherboard and connected to the first unit memory modules 108 through the network engine 152.

The second unit memory modules 114 can each include a network engine 154 which can have the same properties as the network engine 152 within the first unit memory modules 108. The network engine 154 can also be located separately from the second unit memory modules 114 in the same manner as the network engine 152.

The high-speed interconnects 116 allows the first unit memory modules 108 and the second unit memory modules 114 to be treated as a single pool of physical memory. The network engine 152 and the network engine 154 ensure that data can be moved between the first unit memory modules 108 and the second unit memory modules 114 without unnecessary delay or collisions. It has been discovered that the direct connection between the first unit memory modules 108 and the second unit memory modules 114 using the high-speed interconnects 116 allows for effectively doubling the physical memory of either the first discrete unit 102 or the second discrete unit 104 in a manner completely transparent to the first unit processor 106 or the second unit processor 112. For example, if the first discrete unit 102 is under heavy load but the second discrete unit 104 is sitting idle, the first discrete unit 102 can "borrow" the second unit memory modules 114 from the second discrete unit 104. This allows the first unit processor 106 to operate with double the amount of physical memory ordinarily accessible when using only the first unit memory modules 108. This can allow for faster processing, less delay, and more efficient use of all resources without the need for complicated parallel processing code spanning multiple discrete units.

It is been discovered that locating the network engine 152 and the network engine 154 within the first unit memory modules 108 and the second unit memory modules 114, respectively, allows for very high granularity in the use of idle memory modules. The high-speed interconnects 116 can be connected between each of the first unit memory modules 108 and the corresponding one of the second unit memory modules 114. This point-to-point connection provides a large amount of flexibility and granularity in the use of idle memory modules. For example, if the second unit processor 112 requires only half of the memory available in the second unit memory modules 114, the other half of the second unit memory modules 114 can be utilized by the first unit processor 106 of the first discrete unit 102 to perform a task which requires a larger amount of memory. Each of the second unit memory modules 114, for example, can be utilized as necessary without a large impact on the operation of the second unit processor 112. Of course, the same can happen in reverse; the second discrete unit 104 can "borrow" the first unit memory modules 108 to perform tasks requiring large amounts of memory if the first discrete unit 102 is sitting idle.

It has been further discovered that the high-speed interconnects 116 between the first unit memory modules 108 and the second unit memory modules 114 improves data integrity for mission-critical processes. In addition to borrowing the physical memory, the high-speed interconnects 116 can allow for transparent replication of data across interconnected memory modules. For example, for important tasks or processes, data can be replicated from the first unit memory modules 108 on to the second unit memory modules 114 to guard against errors or power loss to only the first discrete unit 102. This data replication across memory modules can also allow for easy verification of calculations as necessary.

Figure 2:
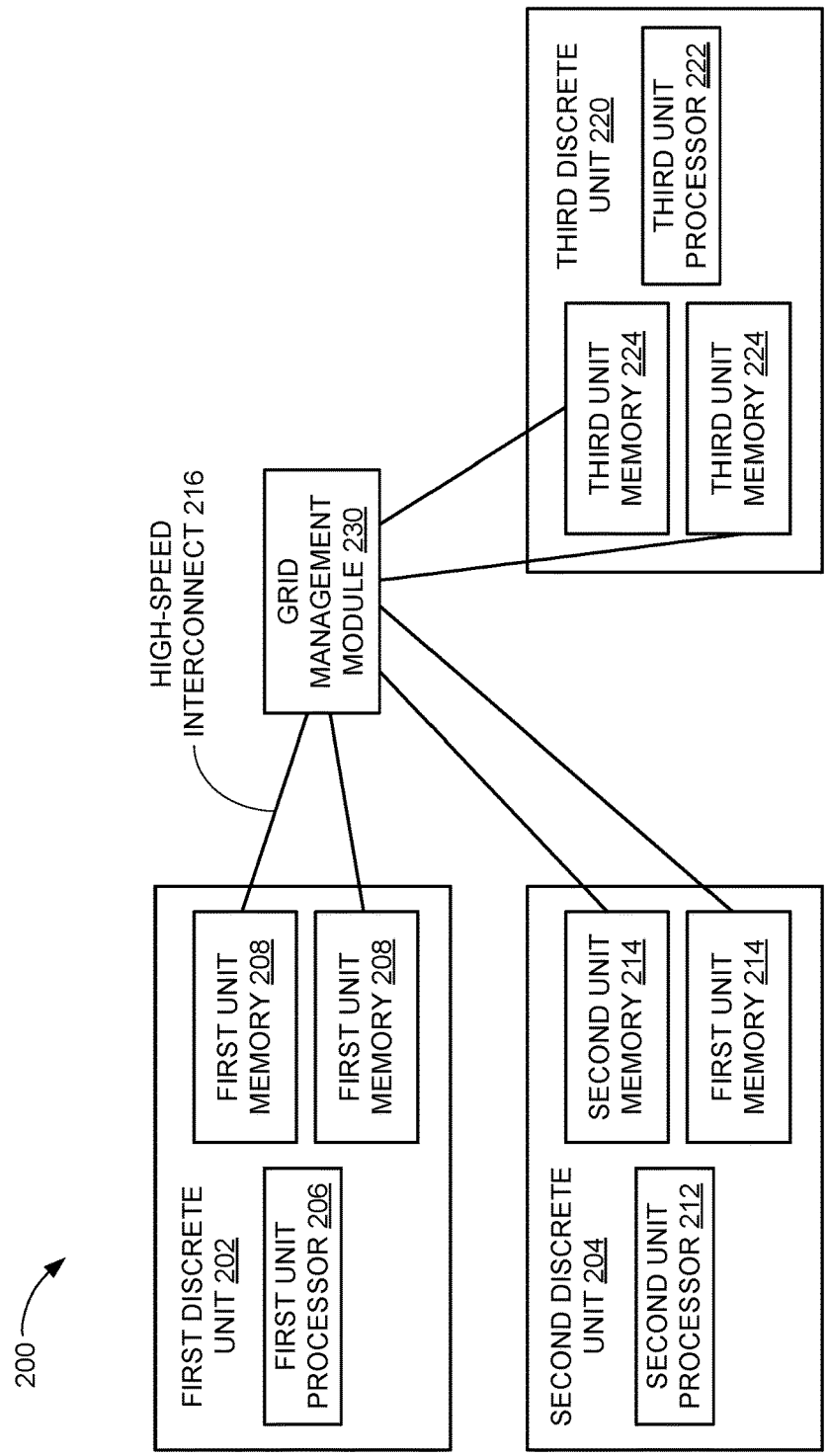
FIG. 2 is an interconnected memory system in a second embodiment of the present invention.

Referring now to FIG. 2, therein is shown an interconnected memory system 200 in a second embodiment of the present invention. Shown in this figure are a first discrete unit 202, a second discrete unit 204, and a third discrete unit 220, all connected via high-speed interconnects 216 to a grid management module 230. The number of discrete units shown are for example only, and it is understood that there can be more than three discrete units in any given implementation of the interconnected memory system 200.

The first discrete unit 202 contains a first unit processor 206 and first unit memory modules 208. Storage units and other necessary hardware are omitted from the drawings for clarity. The first unit processor 206 acts as the central processing unit for the first discrete unit 202 and uses the first unit memory modules 208 to carry out various processing tasks. The first unit memory modules 208 can have volatile memory, nonvolatile memory, or some combination thereof. For example, the first unit memory modules 108 can be DRAM modules with or without some type of NAND flash memory.

The second discrete unit 204 contains a second unit processor 212 and second unit memory modules 214. Storage units and other necessary hardware are omitted from the drawing for clarity. The second unit processor 212 acts as a central processing unit for the second discrete unit 204 and uses the second unit memory modules 214 to carry out various processing tasks. The second unit memory modules 214 can have volatile memory, nonvolatile memory, or some combination thereof. For example, the second unit memory modules 214 can be DRAM modules with or without some type of NAND flash memory. The second discrete unit 204 can contain the same or modified hardware as compared to the first discrete unit 202.

The third discrete unit 220 contains a third unit processor 222 and third unit memory modules 224. Storage units and other necessary hardware are omitted from the drawing for clarity. The third unit processor 222 acts as a central processing unit for the third discrete unit 220 and uses the third unit memory modules 224 to carry out various processing tasks. The third unit memory modules 224 can have volatile memory, nonvolatile memory, or some combination thereof. For example, the third unit memory modules 224 can be DRAM modules with or without some type of NAND flash memory. The third discrete unit 220 can contain the same or modified hardware as compared to the first discrete unit 202 or the second discrete unit 204.

The first unit memory modules 208, the second unit memory modules 214, and the third unit memory modules 224 can be linked to each other through the high-speed interconnects 216. In this example, the high-speed interconnects 216 are represented by the straight lines between the memory modules and the grid management module 230, and only one is labeled for clarity. The high-speed interconnects 216 between all of the memory modules allows for the first unit memory modules 208, the second unit memory modules 214, and the third unit memory modules 224 to be treated as a one memory grid or array. Management of the memory grid requires the use of the grid management module 230, which can be a hub, a switch, a router, or other hardware which can manage traffic between the first unit memory modules 208, the second unit memory modules 214, and the third unit memory modules 224.

The grid management module 230 can act as a central hub for all traffic between the memory units. Not shown in the figure for clarity are the network engines for each of the memory units to enable the first unit memory modules 208, the second unit memory modules 214, and the third unit memory modules 224 to communicate with each other through the grid management module 230. The network engines can be hardware for enabling and processing network traffic. The network engines can be chips either integrated within the memory modules or located elsewhere within the discrete units.

The high-speed interconnects 216 can connect directly to the first unit memory modules 208, the second unit memory modules 214, and the third unit memory modules 224. The other end of the high-speed interconnects 216 can connect directly to the grid management module 230. This direct linkage may be utilized to provide the shortest path possible between the memory modules and the grid management module 230. The grid management module 230 can provide the portion of the logic required to manage the memory grid, for example.

It has been discovered that the direct connection between the first unit memory modules 208, the second unit memory modules 214, and the third unit memory modules 224 using the high-speed interconnects 216 allows for effectively unlimited physical memory. For example, the physical memory of either the first discrete unit 202 or the second discrete unit 204 could be used by the third discrete unit 220 in a manner completely transparent to the first unit processor 206, the second unit processor 212, or the third unit processor 222. For example, if the third discrete unit 220 is under heavy load but the second discrete unit 204 is sitting idle, the third discrete unit 220 can "borrow" the memory space of the second unit memory modules 214 from the second discrete unit 204. This allows the third unit processor 222 to operate with double the amount of physical memory ordinarily accessible when using only the third unit memory modules 224. If additional memory is required, the third discrete unit 220 can "borrow" the memory space of the first unit memory modules 208 and then operate with effectively triple the memory ordinarily accessible. This can be scaled to as many discrete units as desired so long as they are all connected through the grid management module 230. This can allow for faster processing, less delay, and more efficient use of all resources without the need for complicated parallel processing code spanning multiple discrete units.

It is been discovered that locating the network engines within the first unit memory modules 208, the second unit memory modules 214, and the third unit memory modules 224, for example, allows for very high granularity in the use of idle memory modules. The high-speed interconnects 216 can be connected between each of the memory modules and the grid management module 230. This direct connection provides a large amount of flexibility and granularity in the use of idle memory modules. For example, if the second unit processor 212 requires only half of the memory available in the second unit memory modules 214, the other half of the second unit memory modules 214 can be utilized by the first unit processor 206 of the first discrete unit 202 to perform a task which requires a larger amount of memory. Each of the second unit memory modules 214, for example, can be utilized as necessary without a large impact on the operation of the second unit processor 212. Of course, the same can happen in reverse; the second discrete unit 204 can "borrow" the first unit memory modules 208 to perform tasks requiring large amounts of memory if the first discrete unit 202 is sitting idle.

It is also been discovered that locating the network engines on a motherboard, as opposed to within the first unit memory modules 208, the second unit memory modules 214, and the third unit memory modules 224, allows for the creation of more compact systems. Especially in the case of server blades or other smaller form factor systems as the first discrete unit 202, for example, the additional functionality provided by the network engine can take up space on the first unit memory modules 208 and may impact the minimum size of the entire system. By locating the network engine, for example, on the motherboard of the first discrete unit 202, the height and size restrictions can be bypassed since the motherboard will have more usable space than the first unit memory modules 208. Additionally, the network engine can then be larger and allowed to consume more power which can increase efficiency during operation. In this particular example, the network engine would be connected to each of the first unit memory modules 208 and then to the high-speed interconnects 216, which would then be connected to the grid management module 230.

It has been further discovered that the high-speed interconnects 216 between the grid management module 230, the first unit memory modules 208, the second unit memory modules 214, and the third unit memory modules 224, improves data integrity for mission-critical processes. In addition to borrowing the physical memory, the high-speed interconnects 216 can allow for transparent replication of data across the entire memory grid facilitated by the grid management module 230. For example, for important tasks or processes, data can be replicated from the first unit memory modules 208 on to the second unit memory modules 214 to guard against errors or power loss to only the first discrete unit 202. This data replication across memory modules can also allow for easy verification of calculations as necessary. For example, the more critical a calculation, the more times it could be run simultaneously in order to ensure an accurate result.

Thus, it has been discovered that the interconnected memory system 200 furnishes important and heretofore unknown and unavailable solutions, capabilities, and functional aspects for dynamically scaling physical memory on an on-demand basis in a manner transparent to individual discrete units. Each individual unit processor does not need to be aware of how the memory grid or additional memory is added or created; for example, the first unit processor 206 on a needs to know that for a particular calculation it has triple the amount of memory ordinarily available to it. Effectively, each processor has unlimited physical memory available to it as necessary. The network engines and the grid management module 230 can facilitate movement of data such that the first unit processor 206, for example, does not need to change the way that the first unit processor 206 performs calculations. This allows for programming simplicity and additional physical memory any time it is required with only the addition of some additional hardware.

Figure 3:
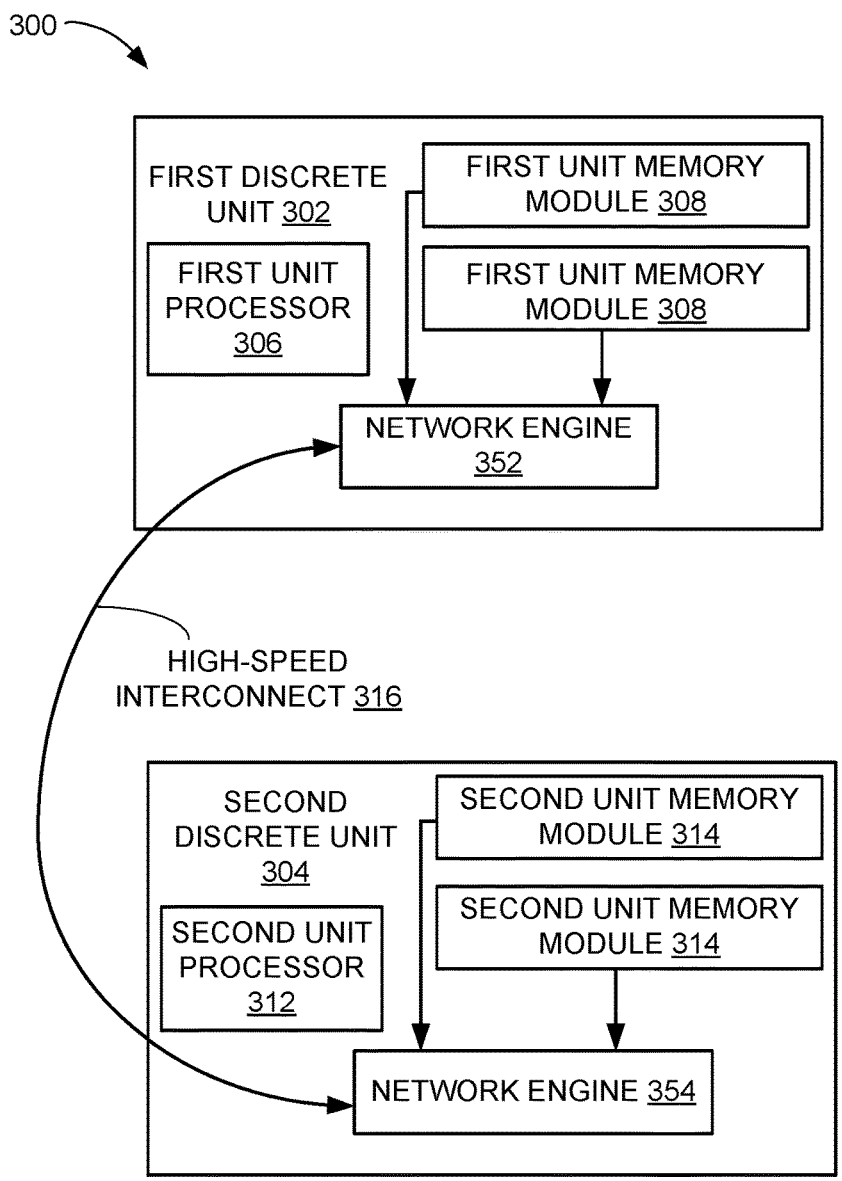
FIG. 3 is an interconnected memory system in a third embodiment of the present invention.

Referring now to FIG. 3, therein is shown an interconnected memory system 300 in a third embodiment of the present invention. Visible in this figure are a first discrete unit 302 and a second discrete unit 304. The first discrete unit 302 and the second discrete unit 304 can operate independently from each other. Examples where the interconnected memory system 300 can be implemented include datacenters, cloud storage and service centers, server farms, or any locations where multiple independent systems operate in close proximity. In these examples, the first discrete unit 302 and the second discrete unit 304 can be independent servers in traditional cases, blades in a rack, or any other configuration which separates independent units from each other.

The first discrete unit 302 contains a first unit processor 306 and first unit memory modules 308. Storage units and other necessary hardware are omitted from the drawings for clarity. The first unit processor 306 acts as the central processing unit for the first discrete unit 302 and uses the first unit memory modules 308 to carry out various processing tasks. The first unit memory modules 308 can have volatile memory, nonvolatile memory, or some combination thereof. For example, the first unit memory modules 308 can be DRAM modules with or without some type of NAND flash memory.

The second discrete unit 304 contains a second unit processor 312 and second unit memory modules 314. Storage units and other necessary hardware are not shown for clarity. The second unit processor 312 acts as a central processing unit for the second discrete unit 304 and uses the second unit memory modules 314 to carry out various processing tasks. The second unit memory modules 314 can have volatile memory, nonvolatile memory, or some combination thereof. For example, the second unit memory modules 314 can be DRAM modules with or without some type of NAND flash memory. The second discrete unit 304 can contain the same or modified hardware as compared to the first discrete unit 302.

The first unit memory modules 308 and the second unit memory modules 314 can be connected by a high-speed interconnect 316. The high-speed interconnect 316 is shown as a curved line in this example. The high-speed interconnects 316 can be ethernet, optical fiber, or any other interconnect operating at speeds above 1 Gbps, for example.

The first unit memory modules 308 can be connected to a network engine 352. The network engine 352 is defined as hardware for enabling and processing network traffic. The network engine 352 can be a chip, for example. The network engine 352 can also be integrated within other chips located on the motherboard or a memory controller, for example. The network engine 352 is shown as being separate from the first unit memory modules 308. For example, the network engine 352 can be located elsewhere within the first discrete unit 302 such as on the motherboard adjacent to the first unit memory modules 308. In this case, the high-speed interconnect 316 can be connected directly to the network engine 352 and connected to the first unit memory modules 308 through the network engine 352.

The second unit memory modules 314 can be connected to a network engine 354 which can have the same properties as the network engine 352 connected to the first unit memory modules 308. The network engine 354 can also be located separately from the second unit memory modules 314 in the same manner as the network engine 352.

The high-speed interconnect 316 allows the first unit memory modules 308 and the second unit memory modules 314 to be treated as a single pool of physical memory. The network engine 352 and the network engine 354 ensure that data can be moved between the first unit memory modules 308 and the second unit memory modules 314 without unnecessary delay or collisions. It has been discovered that the direct connection between the network engine 352 and the network engine 354 using the high-speed interconnect 316 allows for effectively doubling the physical memory of either the first discrete unit 302 or the second discrete unit 304 in a manner completely transparent to the first unit processor 306 or the second unit processor 312. For example, if the first discrete unit 302 is under heavy load but the second discrete unit 304 is sitting idle, the first discrete unit 302 can "borrow" the second unit memory modules 314 from the second discrete unit 304. This allows the first unit processor 306 to operate with double the amount of physical memory ordinarily accessible when using only the first unit memory modules 308. This can allow for faster processing, less delay, and more efficient use of all resources without the need for complicated parallel processing code spanning multiple discrete units.

It is also been discovered that locating the network engine 352 or the network engine 354 on a motherboard as opposed to within the first unit memory modules 308 or the second unit memory modules 314, respectively, allows for the creation of more compact systems. Especially in the case of server blades or other smaller form factor systems as the first discrete unit 302, for example, the additional functionality provided by the network engine 352 can take up space on the first unit memory modules 308 and may impact the minimum size of the entire system. By locating the network engine 352, for example, on the motherboard of the first discrete unit 302, the height and size restrictions can be bypassed since the motherboard will have more usable space than the first unit memory modules 308. Additionally, the network engine 352 can then be larger and allowed to consume more power which can increase efficiency during operation. In this particular example, the network engine 352 would be connected to each of the first unit memory modules 308 and then to one of the high-speed interconnects 316, which would then be connected to the network engine 354 of the second discrete unit 304.

It has been further discovered that the high-speed interconnects 316 connected between the first unit memory modules 308 and the second unit memory modules 314 improves data integrity for mission-critical processes. In addition to borrowing the physical memory, the high-speed interconnects 316 can allow for transparent replication of data across interconnected memory modules. For example, for important tasks or processes, data can be replicated from the first unit memory modules 308 on to the second unit memory modules 314 to guard against errors or power loss to only the first discrete unit 302. This data replication across memory modules can also allow for easy verification of calculations as necessary.

Figure 4:
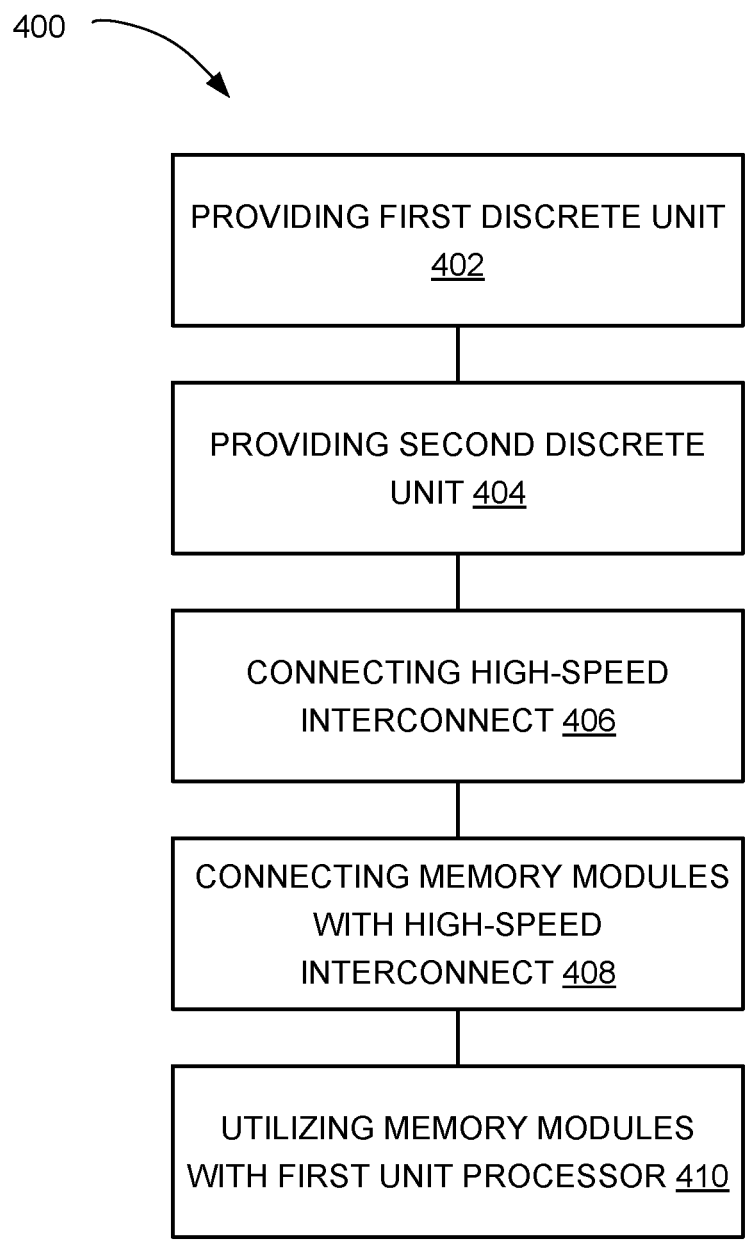
FIG. 4 is a flow chart of a method of operation of an interconnected memory system in a further embodiment of the present invention.

Referring now to FIG. 4, therein is shown a flow chart of a method 400 of operation of an interconnected memory system in a further embodiment of the present invention. The method 400 includes: providing a first discrete unit having a first unit processor and first unit memory module in a block 402; providing a second discrete unit having a second unit processor and a second unit memory module in a block 404; connecting a high-speed interconnect directly to the first unit memory module in a block 406; connecting the second unit memory module to the first unit memory module through the high-speed interconnect in a block 408; and utilizing the first unit memory module and the second unit memory module with the first unit processor in a block 410.

The resulting method, process, apparatus, device, product, and/or system is straightforward, cost-effective, uncomplicated, highly versatile and effective, can be surprisingly and unobviously implemented by adapting known technologies, and are thus fully compatible with conventional manufacturing methods or processes and technologies.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an interconnected memory system comprising:
    connecting a first discrete unit to a second discrete unit, the first discrete unit having a first unit processor with a first unit memory module, the first unit memory module having a first network engine within the first unit memory module, the first unit memory module configured as a dynamic random access memory (DRAM) module, the second discrete unit having a second unit processor with a second unit memory module, the second unit memory module having a second network engine within the second unit memory module, and the second unit memory module configured as a DRAM module;
    establishing a network interconnect between the second network engine of the second unit memory module and the first network engine of the first unit memory module, the network interconnect configured to bypass the first unit processor; and
    accessing the second unit memory module from the first unit memory module over the network interconnect.

2. The method as claimed in claim 1 wherein establishing the network interconnect includes forming a point-to-point connection between the first unit memory module and the second unit memory module.

3. The method as claimed in claim 1 wherein establishing the network interconnect includes forming an optical connection between the first unit memory module and the second unit memory module.

4. The method as claimed in claim 1 further comprising connecting the network interconnect to a grid management module.

5. The method as claimed in claim 1 wherein establishing a network interconnect includes accessing the second unit memory module through the network interconnect.

6. A method of operation of an interconnected memory system comprising:
    connecting a first discrete unit to a second discrete unit, the first discrete unit having a first unit processor with a first unit memory module, the first unit memory module having a first network engine within the first unit memory module, the first unit memory module configured as a dynamic random access memory (DRAM) module; the second discrete unit having a second unit processor with a second unit memory module, the second unit memory module having a second network engine within the second unit memory module, and the second unit memory module configured as a DRAM module;
    establishing a network interconnect between the first network engine of the first unit memory module and second network engine of the second unit memory module, the network interconnect having a grid management module, and the network interconnect configured to bypass the first unit processor; and
    accessing the second unit memory module from the first unit memory module, the second unit memory module accessed through the network interconnect and the grid management module.

7. The method as claimed in claim 6 further comprising:
    connecting a third discrete unit having a third unit processor with a third unit memory module; and
    connecting another network interconnect between the third unit memory module and the grid management module.

8. The method as claimed in claim 6 wherein establishing the network interconnect includes forming a point-to-point, optical, or ethernet connection between the first unit memory module and the second unit memory module.

9. The method as claimed in claim 6 wherein establishing the network interconnect includes connecting the network interconnect to a hub, switch, or router.

10. The method as claimed in claim 6 wherein/further comprising:
- connecting a third discrete unit having a third unit processor with a third unit memory module;
- connecting another network interconnect between the third unit memory module and the grid management module; and
- accessing the first unit memory module, the second unit memory module, and the third unit memory module with the first unit processor.

11. An interconnected memory system comprising:
- a first discrete unit having a first unit processor and first unit memory module, the first unit memory module having a first network engine within the first unit memory module, and the first unit memory module configured as a dynamic random access memory (DRAM) module;
- a second discrete unit having a second unit processor and a second unit memory module, the second unit memory module having a second network engine within the second unit memory module, and the second unit memory module configured as a DRAM module,
- a network interconnect connected between the first network engine of the first unit memory module and the second network engine of the second unit memory module, and the first unit memory module configured to access the second unit memory module.

12. The system as claimed in claim 11 wherein the network interconnect is a point-to-point connection between first unit memory module and the second unit memory module.

13. The system as claimed in claim 11 wherein the network interconnect is an optical connection between the first unit memory module and the second unit memory module.

14. The system as claimed in claim 11 further comprising a grid management module connected to the network interconnect.

15. The system as claimed in claim 11 further comprising another network engine on the second unit memory module.

16. The system as claimed in claim 11 further comprising:
- a grid management module connected between the first network engine and the second network engine.

17. The system as claimed in claim 16 further comprising:
- a third discrete unit having a third unit processor and a third unit memory module, the third discrete unit connected to the grid management module; and
- another network interconnect between the third unit memory module and the grid management module.

18. The system as claimed in claim 16 wherein the network interconnect is a point-to-point connection between the first unit memory module and the second unit memory module.

19. The system as claimed in claim 16 wherein the grid management module is a hub, switch, or router.

20. The system as claimed in claim 16 wherein the network interconnects is ethernet or fiber-optic cable.

* * * * *